(12) United States Patent
Pan et al.

(10) Patent No.: US 11,677,121 B2
(45) Date of Patent: Jun. 13, 2023

(54) BATTERY PACK

(71) Applicant: CALB Co., Ltd., Jiangsu (CN)

(72) Inventors: Fangfang Pan, Changzhou (CN);
Junshan Guan, Luoyang (CN);
Liangjie Gu, Luoyang (CN); Tinglu Yan, Zhangzhou (CN); Yongjie Zhang, Luoyang (CN); Qixin Guo, Luoyang (CN)

(73) Assignee: CALB Co., Ltd., Jiangsu (CN)

( * ) Notice: Subject to any disclaimer, the term of this patent is extended or adjusted under 35 U.S.C. 154(b) by 17 days.

(21) Appl. No.: 17/373,691

(22) Filed: Jul. 12, 2021

(65) Prior Publication Data

US 2022/0367983 A1 Nov. 17, 2022

(30) Foreign Application Priority Data

May 14, 2021 (CN) .......................... 202110528552.X (51) Int. Cl.
*H01M 50/528* (2021.01)
*H01M 50/204* (2021.01)

(52) U.S. Cl.
CPC ....... *H01M 50/528* (2021.01); *H01M 50/204* (2021.01)

(58) Field of Classification Search
CPC ........................... H01M 50/528; H01M 50/204
See application file for complete search history.

(56) References Cited

U.S. PATENT DOCUMENTS

| | | |
|---|---|---|
| 2008/0014499 A1 | 1/2008 | Ling |
| 2011/0300427 A1 | 12/2011 | Iwasa et al. |
| 2012/0301762 A1 | 11/2012 | Welker et al. |

FOREIGN PATENT DOCUMENTS

| | | |
|---|---|---|
| CN | 111355197 | 6/2020 |
| DE | 112017000545 | 10/2018 |
| EP | 3796459 | 3/2021 |
| GB | 2536281 | 9/2016 |
| WO | 2021047329 | 3/2021 |

OTHER PUBLICATIONS

"Search Report of Europe Counterpart Application", dated Dec. 20, 2021, pp. 1-16.

*Primary Examiner* — Jane J Rhee
(74) *Attorney, Agent, or Firm* — JCIP Global Inc.

(57) ABSTRACT

The disclosure relates to a technical field of batteries, and in particular, relates to a battery pack. The battery pack includes a box body, a beam, a battery apparatus, and an electrical support base. The beam is disposed in the box body. The battery apparatus is disposed in the box body, and an electrical conductor is disposed on the battery apparatus. The electrical support base is disposed on the beam. The electrical conductor extends from the battery apparatus to the electrical support base and is connected to the electrical support base.

9 Claims, 5 Drawing Sheets

BATTERY PACK

CROSS-REFERENCE TO RELATED APPLICATION

This application claims the priority of China patent application serial no. 202110528552.X, filed on May 14, 2021. The entirety of the above-mentioned patent application is hereby incorporated by reference herein and made a part of this specification.

BACKGROUND

Technical Field

The disclosure relates to a technical field of batteries, and in particular, relates to a battery pack.

Description of Related Art

With the development and progress of technology, the application of electric cars grows. At present, due to the limitation of battery energy density and other reasons, the battery life of electric cars is relatively short. One solution is to arrange as many batteries as possible in the accommodating compartments holding the batteries. Further, electrical support bases and other devices are also required to be installed in the battery pack. At present, most of the electrical support bases are arranged at the end plate of the battery module. In such an arrangement, the space in the battery module is occupied, and the accommodating compartments for accommodating the batteries may not be used to hold as many batteries as possible.

Note that the above-mentioned information disclosed in the BACKGROUND section is only used to strengthen the understanding of the background of the disclosure, and therefore it may include information that does not constitute the prior art known to a person having ordinary skill in the art.

SUMMARY

The disclosure provides a battery pack including a box body, a beam, a battery apparatus, and an electrical support base. The beam is disposed in the box body. The battery apparatus is disposed in the box body, and an electrical conductor is disposed on the battery apparatus. The electrical support base is disposed on the beam. The electrical conductor extends from the battery apparatus to the electrical support base and is connected to the electrical support base.

In an embodiment of the disclosure, the battery pack includes the box body, the beam, the battery apparatus, and the electrical support base. The box body and the beam form battery compartments for accommodating batteries.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The disclosure aims to provide a battery pack, and a space in the battery pack is effectively used at least to a certain extent.

Figure 1:
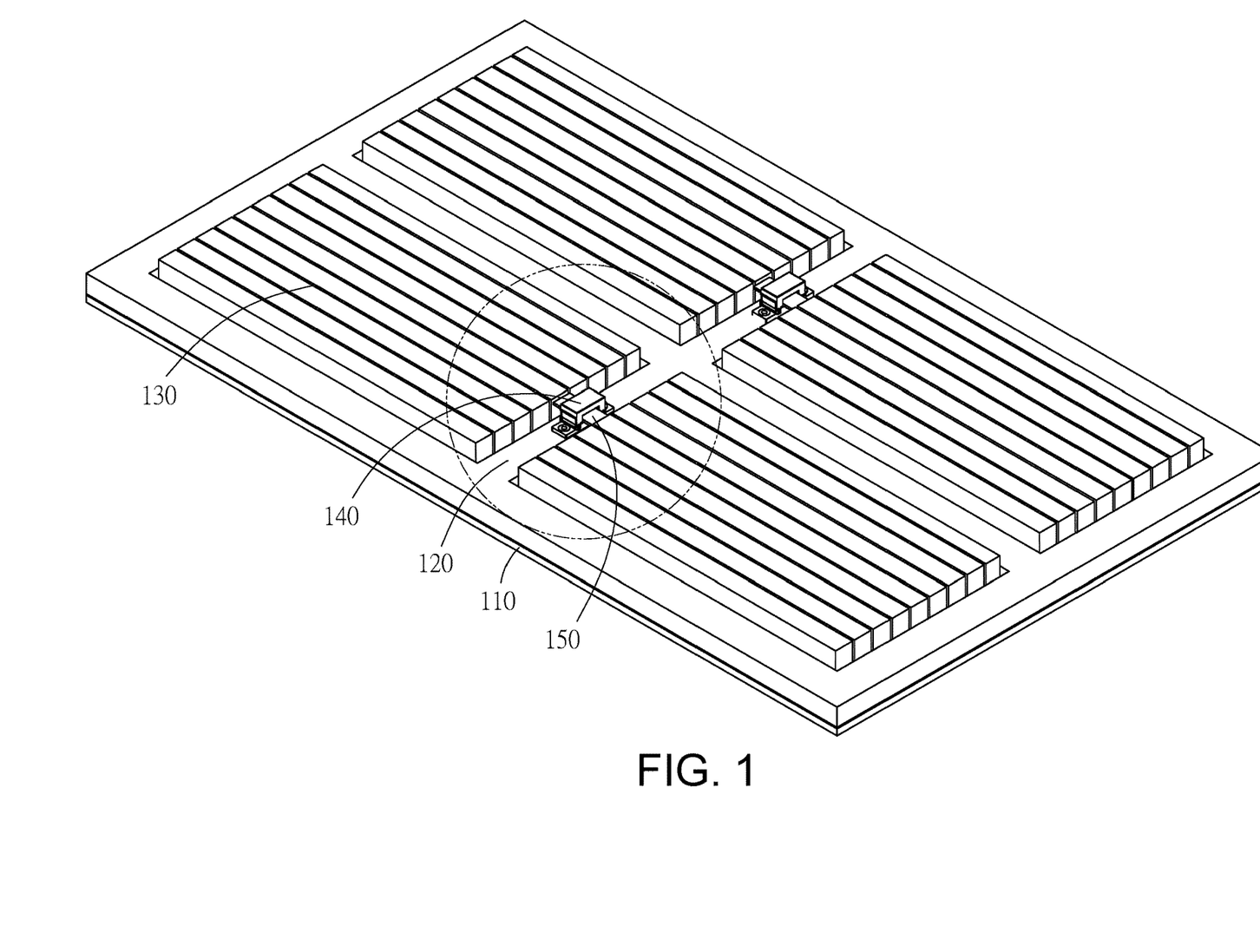
FIG. 1 is a schematic view of a battery pack according to an exemplary embodiment of the disclosure.
Figure 2:
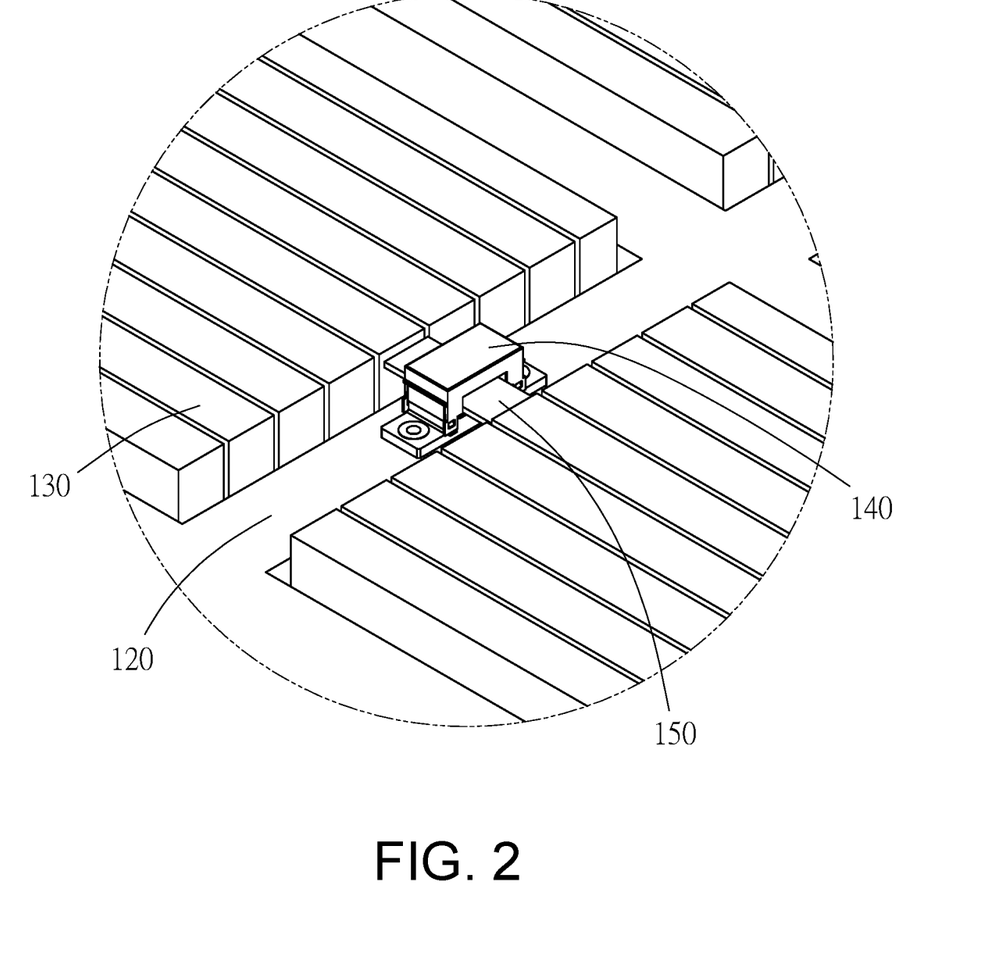
FIG. 2 is a schematic local enlargement view of the battery pack according to an exemplary embodiment of the disclosure.

In this exemplary embodiment, a battery pack is provided. As shown in FIG. 1 and FIG. 2, the battery pack includes a box body 110, a beam 120, a battery apparatus 130, and an electrical support base 140. The beam 120 is disposed in the box body 110, and the battery apparatus 130 is disposed in the box body 110. The battery apparatus 130 includes two or more batteries, and an electrical conductor 150 is disposed on the battery apparatus 130. The electrical support base 140 is disposed on the beam 120, and the electrical conductor 150 extends from the battery apparatus 130 to the electrical support base 140 and is connected to the electrical support base 140.

The battery pack provided by the embodiments of the disclosure includes the box body 110, the beam 120, the battery apparatus 130, and the electrical support base 140. The box body 110 and the beam 120 form battery compartments for accommodating batteries. The electrical support base 140 electrically connected to the battery apparatus 130 is disposed on the beam 120, and in this way, spaces in the battery compartments may be saved, more batteries may be disposed in the battery compartments, and the spaces in the battery compartments may be effectively used.

Components of the battery pack provided by the embodiments of the disclosure are described in detail as follows.

The box body 110 in the embodiments of the disclosure may include a bottom plate and a border frame. The border frame is connected to the bottom plate 110, the beam 120 and the border frame form a plurality of accommodating portions, and the battery apparatus 130 is disposed in the accommodating portion.

The bottom plate may be a flat plate structure or a near-flat plate structure. For instance, the bottom plate may be a stainless steel plate or an aluminum alloy plate and the like. The bottom plate is provided with an accommodating zone, and the accommodating zone is configured to hold a battery or the battery apparatus 130. An orthographic projection of the battery or the battery apparatus 130 on the bottom plate is located in the accommodating zone. The battery or the battery apparatus 130 may be directly placed in the accommodating zone. Alternatively, other devices, such as a cooling device, may also be disposed between the battery or the battery apparatus 130 and the bottom plate, which is not specifically limited by the embodiments of the disclosure.

The border frame may include a plurality of frame beams, and the frame beams and the bottom plate form the accommodating zone configured to hold the battery apparatus 130. The beam 120 may be an inner beam. The inner beam is disposed in the accommodating zone, the inner beam divides the accommodating zone into the accommodating portions (i.e., the battery compartments), and each of the battery compartments is provided with one battery apparatus 130.

The accommodating zone on the bottom plate may exhibit a rectangular structure. The battery pack may include four frame beams, and the four frame beams are connected end to end to form the border frame. For instance, the battery pack may include a first frame beam, a second frame beam, a third frame beam, and a fourth frame beam. The first frame beam, the second frame beam, the third frame beam, and the fourth frame beam are connected end to end and may form the border frame through welding.

The inner beam may be disposed in a frame. The inner beam may include a first beam (a horizontal beam) and a second beam (a vertical beam). The first beam and the second beam are disposed in an alternating manner, for example, the first beam and the second beam are perpendicularly disposed.

Herein, the battery support assembly may include one first beam and one second beam. The first beam is parallel to a first border frame, and the second beam is parallel to a second border frame. The first beam and the second beam divide the accommodating zone into four sub-accommodating zones, and the four sub-accommodating zones are provided with batteries or the battery apparatus 130. Certainly, in practical applications, numbers of the first beam and the second beam may be multiple, and the embodiments of the disclosure are not limited thereto.

The inner beam and the bottom plate may be connected through welding, and the frame beams and the bottom plate may be connected through welding. A bottom surface of the inner beam contacts a top surface of the bottom plate. The bottom surface of the inner beam is a flat surface, and the top surface of the bottom plate is a flat surface, so that fillet welding may be performed on two sides of the inner beam to connect the inner beam and the bottom plate. A bottom surface of the frame beams contacts the top surface of the bottom plate. The bottom surface of the frame beams is a flat surface, and the top surface of the bottom plate is a flat surface, so that fillet welding may be performed on inner and outer sides of the frame beams to connect the frame beams and the bottom plate.

Further, in order to improve strength of the connection between the beam 120 and the bottom plate, a glue container may be disposed on the bottom plate and/or the beam 120. A connecting glue layer is disposed in the glue container to connect the bottom plate and the beam 120. The glue container may be disposed on the beam 120, the glue container may be disposed on the bottom plate, or both the bottom plate and the beam 120 are provided with glue containers. A glue injection channel may be provided on the beam 120 or the bottom plate, and the glue injection channel is configured to communicate with the outside after the beam 120 is connected to the bottom plate. The glue injection channel communicates with the glue container, and the connecting glue layer is disposed in the glue container to glue the bottom plate to the beam 120.

In the embodiments of the disclosure, the battery apparatus 130 may include at least one battery. When the battery apparatus 130 includes multiple batteries, the batteries are arranged in the battery compartments in sequence. The batteries may be connected through connecting glue, the batteries may be connected through cable ties, or the batteries may be directly placed in the battery compartments. The batteries may be wound batteries or laminated batteries. Each of the batteries includes a housing and an electric cell, and the electric cell is disposed in the housing. The housing is provided with electrode posts, and the electrode posts are connected to electrode sheets on the electric cell.

When the battery apparatus is disposed in the battery compartment, the housing of each of the batteries in the battery apparatus directly contacts a structure in the battery compartment. For instance, the batteries located on two ends of the battery apparatus respectively contact the beam 120, a bottom surface of the batteries in the battery apparatus, and the top surface of the bottom plate. As the housing of each of the batteries directly contacts the box body, a battery module housing and other devices are not required to be arranged in the box body, so more batteries may be added to the box body, and energy density of the battery pack is thereby increased.

In the embodiments of the disclosure, the electrical support base 140 is disposed on the beam 120, and the electrical support base 140 may be disposed on the frame beams or on the inner beam.

In a practical embodiment of the disclosure, one battery apparatus 130 is connected to one electrical support base 140, and the electrical support base 140 may be disposed on any one beam 120 among a plurality of the beams 120 surrounding the battery compartments. In practical applications, the electrical conductor 150 of the battery usually protrudes from a direction parallel to a large surface of the battery, so that the electrical support base 140 may be disposed on the beam 120 at both ends of the battery. In addition, in order to prevent a battery holder from being damaged as the electrical support base 140 is located at an edge of a battery box, the electrical support base 140 may be disposed on the inner beam.

In another practical embodiment of the disclosure, the beam 120 and the box body 110 forms plural battery compartments, each of the battery compartments is provided with the battery apparatus 130, and the electrical conductors 150 on the plural battery assemblies 130 are connected to the same electrical support base 140. Herein, the electrical support base 140 may be disposed on the inner beam, so that a length of each of the electrical conductors 150 may be reduced, and in this way, a material of the electrical conductors 150 may be saved on the one hand, and power consumption of the electrical conductors 150 may also be lowered on the other hand.

For instance, two battery assemblies 130 may share one electrical support base 140. The two battery assemblies 130 may be adjacent battery assemblies 130 among the plural battery assemblies 130, and the electrical support base 140 may be mounted on the inner beam between the two battery assemblies 130.

Alternatively, four battery assemblies 130 may share one electrical support base 140, and the four battery assemblies 130 may be arranged in an array. For instance, four frame beams may form a rectangular frame, and the rectangular frame is provided with two inner beams perpendicular to each other. The two inner beams perpendicular to each other and the frame form four battery compartments, each of the four battery compartments is provided with the battery apparatus 130, and the electrical support base 140 may be disposed on a junction point of the two inner beams. Certainly, in practical applications, other numbers of the battery assemblies 130 may share one electrical support base 140, which is not specifically limited in the embodiments of the disclosure.

As one electrical support base 140 is shared by plural battery assemblies 130, fewer electrical support bases 140 are required in the battery pack. In this way, a space in the battery pack is saved, and costs of the battery pack are lowered. A number of electrical connection interfaces in the battery pack is reduced, and stability of electrical connection is improved.

The electrical conductor 150 extends from one end of the battery apparatus 130 close to the electrical support base 140 to the electrical support base 140. The electrical support base 140 may be a high-voltage support base or a low-voltage support base. When the electrical support base 140 is a high-voltage support base, the electrical conductor 150 may be an electrically conductive bar, and the electrically conductive bar may extend from the battery apparatus 130 to the electrical support base 140. When the electrical support base 140 is a low-voltage support base, the electrical conductor 150 may be a signal acquisition line, and the signal acquisition line may extend from the battery apparatus 130 to the electrical support base 140. Herein, a low-voltage connector may be disposed on the electrical support base 140, and the signal acquisition line is connected to the low-voltage connector.

The high-voltage support base refers to the electrical support base 140 connected to the electrode posts of the battery. The high-voltage support base is connected to the battery through the electrically conductive bar, and the high-voltage support base transmits a source signal inputted or outputted by the battery. The low-voltage support base is configured to be connected to the low-voltage connector, and the low-voltage connector is connected to a signal collection and control circuit of the battery.

The electrical conductor 150 continuously extends from the battery apparatus 130 to the electrical support base 140. In this way, other electrically conductive devices (e.g., an adapter) are not required to be connected between the battery apparatus 130 and the electrical support base 140. The electrical conductor 150 of each battery apparatus 130 is directly connected to the electrical support base 140, and process complexity is thereby lowered.

Figure 3:
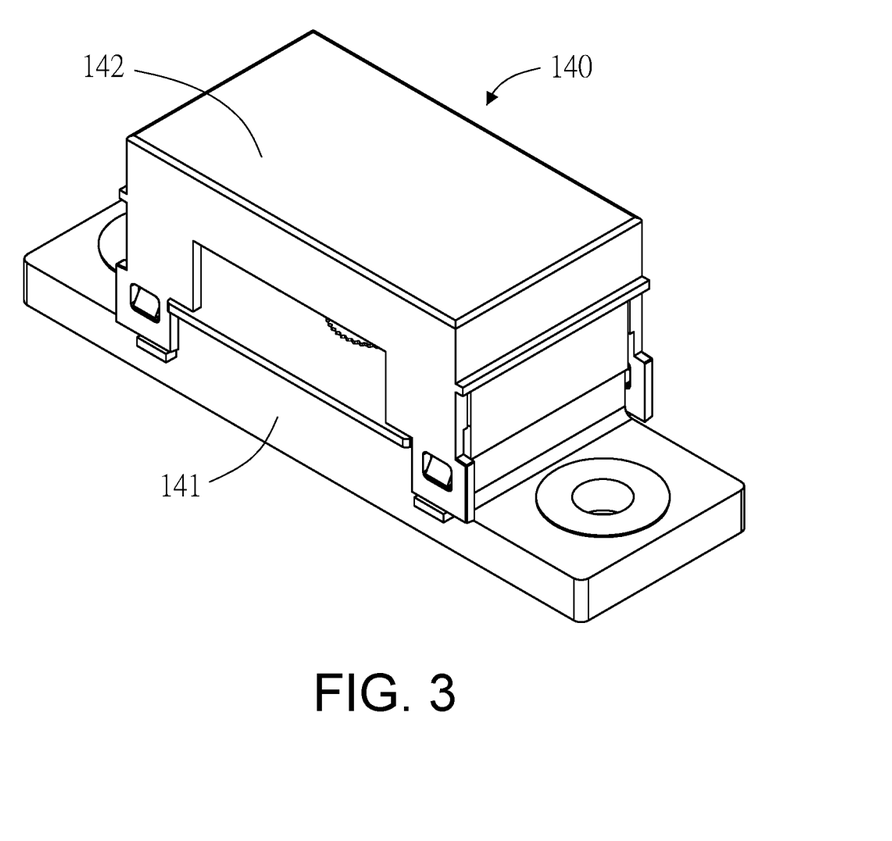
FIG. 3 is a schematic view of an electrical support base according to an exemplary embodiment of the disclosure.

In a practical embodiment of the disclosure, the electrical support base 140 is a high-voltage support base, and the electrical conductor 150 is an electrically conductive bar. As shown in FIG. 3, the electrical support base 140 includes a base body 141 and a protective cover 142. The base body 141 is connected to the beam 120, and the electrically conductive bar is connected to the base body 141. The protective cover 142 is connected to the base body 141, and a cover body at least covers a junction between the base body 141 and the electrically conductive bar.

Herein, the electrical support base 140 may be disposed on one side of the beam 120 away from the bottom plate. The side of the beam 120 away from the bottom plate is provided with a flat surface, and a surface of the electrical support base 140 facing the beam 120 is also a flat surface, that is, a top surface of the beam 120 and a bottom surface of the electrical support base 140 are connected. A material of the electrical support base 140 may be an insulating material (e.g., plastic, rubber, or ceramic material and the like). The electrical support base 140 and the beam 120 may be connected by bolting or riveting and the like. Alternatively, the material of the electrical support base 140 may also be an electrically conductive material (e.g., copper, iron, or aluminum and the like). Here, an insulating material may be coated on a surface of the electrical support base 140 to form an insulating layer covering the electrical support base 140.

Figure 4:
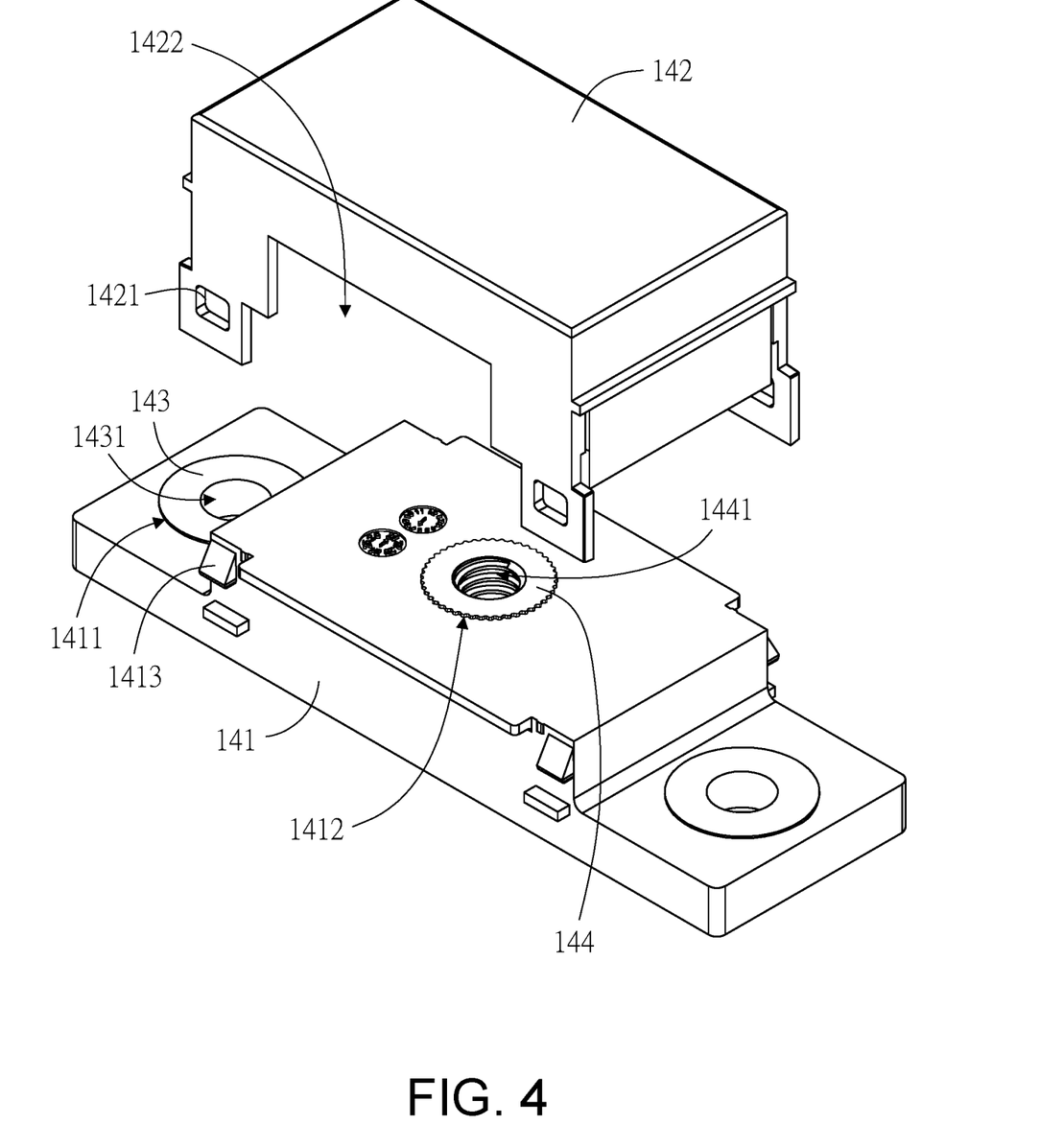
FIG. 4 is a schematic exploded view of the electrical support base according to an exemplary embodiment of the disclosure.

As shown in FIG. 4, the base body 141 is provided with a first connecting portion 1411 and a second connecting portion 1412. Based on the above, the electrical support base 140 further includes: a first reinforcing member 143, a first connecting member, and a second reinforcing member 144. The first reinforcing member 143 is disposed on the first connecting portion 1411, and the first connecting member penetrates the first reinforcing member 143 to connect the base body 141 and the beam 120. The second reinforcing member 144 is disposed on the second connecting portion 1412, the second reinforcing member 144 is configured to be connected to the electrical conductor 150, and the second reinforcing member 144 is higher than the base body 141.

The electrically conductive bars of plural battery assemblies 130 are connected to the same second connecting portion 1412. Other electrical connecting members are not required to be provided among the electrically conductive bars of the battery assemblies 130 that required to be electrically connected. As the electrical conductor 150 and the base body 141 may be connected together through a connecting member (e.g., a bolt), space saving is achieved and manufacturing costs are lowered.

For instance, the first connecting portion 1411 may be a first connecting hole, and the second connecting portion 1412 may be a second connecting hole. The first connecting hole is configured to connect the beam 120, and the second connecting hole is configured to connect the electrically conductive bar. The first connecting hole and the second connecting hole are disposed on different positions of the electrical support base 140. For instance, the electrical support base 140 may be provided with two first connecting holes, and the two first connecting holes are disposed on two sides of the second connecting hole.

Herein, the electrical conductor 150 is an electrically conductive bar, and the second reinforcing member 144 is connected to the electrical conductor 150. On the one hand, it means that the second reinforcing member 144 is structurally connected to the electrically conductive bar, and on the other hand, it means that the second reinforcing member 144 is electrically connected to the electrically conductive bar.

When the base body 141 is made of a plastic material or a rubber material and the like, due to the limitation of strength of the material itself, when the electrical support base 140 and a support base beam are connected by bolts, the electrical support base 140 may be easily damaged, and such connection may thus fail. Therefore, the base body 141 may be provided with the first reinforcing member 143 and the first connecting member. The first reinforcing member 143 is disposed in the first connecting hole, a third connecting hole 1431 is disposed on the first reinforcing member 143, and the first connecting member penetrates the third connecting hole 1431 to connect the base body 141 and the beam 120.

The first connecting hole on the base body 141 may be a round hole. Here, the first reinforcing member 143 may exhibit a cylindrical structure, the circular third connecting hole 1431 is disposed on the first reinforcing member 143, and the third connecting hole 1431 may be a through hole or a threaded hole. The first connecting member may be a bolt, and the bolt is connected to the beam 120 through the third connecting hole 1431. Correspondingly, a projection region of the third connecting hole 1431 on the beam 120 may be provided with a fifth connecting hole. The fifth connecting hole may be a threaded hole or a smooth hole. When the fifth connecting hole is a threaded hole, a bolt is matched with the fifth threaded hole, so as to achieve connection between the electrical support base 140 and the beam 120. When the fifth connecting hole is a smooth hole, a nut may be disposed on the beam 120, and the beam 120 and the electrical support base 140 may be connected through matching of the bolt and the nut. The first connecting hole, the third connecting hole 1431, and the fifth connecting hole may be coaxially arranged.

Figure 5:
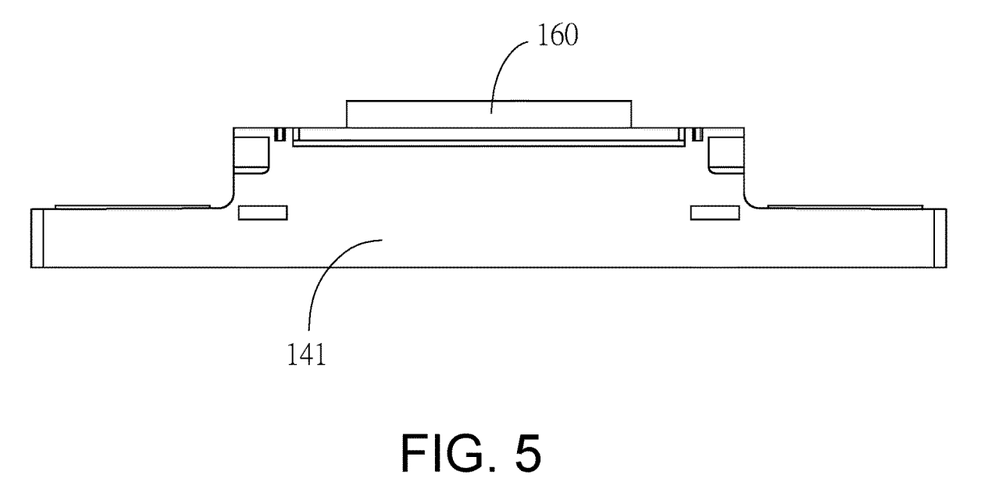
FIG. 5 is a schematic view of the electrical support base according to another exemplary embodiment of the disclosure.

In another practical embodiment of the disclosure, the electrical support base 140 may be a low-voltage support base, and the electrical conductor 150 is a signal acquisition line. Based on the above, as shown in FIG. 5, in the embodiments of the disclosure, the electrical support base 140 further includes a connector 160. The connector 160 is disposed on the base body 141, the protective cover 142 is configured to protect the connector 160, and the signal acquisition line is connected to the connector 160.

Herein, the electrical support base 140 may be disposed on one side of the beam 120 away from the bottom plate. The side of the beam 120 away from the bottom plate is provided with a flat surface, and the surface of the electrical support base 140 facing the beam 120 is also a flat surface, that is, the top surface of the beam 120 and the bottom surface of the electrical support base 140 are connected. The material of the electrical support base 140 may be an insulating material (e.g., plastic, rubber, or ceramic material and the like). The electrical support base 140 and the beam 120 may be connected by bolting or riveting and the like. Alternatively, the material of the electrical support base 140 may also be an electrically conductive material (e.g., copper, iron, or aluminum and the like). Here, an insulating material may be coated on the surface of the electrical support base 140 to form the insulating layer covering the electrical support base 140.

The base body 141 is provided with the first connecting portion 1411 and the second connecting portion 1412. Based on the above, the electrical support base 140 further includes: the first reinforcing member 143, the first connecting member, and the second reinforcing member 144. The first reinforcing member 143 is disposed on the first connecting portion 1411, and the first connecting member penetrates the first reinforcing member 143 to connect the base body 141 and the beam 120. The second reinforcing member 144 is disposed on the second connecting portion 1412, the second reinforcing member 144 is configured to be connected to the electrical conductor 150, and the second reinforcing member 144 is higher than the base body 141.

For instance, the first connecting portion 1411 may be the first connecting hole, and the second connecting portion 1412 may be the second connecting hole. The first connecting hole is configured to connect the beam 120, and the second connecting hole is configured to connect the connector. The first connecting hole and the second connecting hole are disposed on different positions of the electrical support base 140. For instance, the electrical support base 140 may be provided with two first connecting holes, and the two first connecting holes are disposed on two sides of the second connecting hole.

When the base body 141 is made of a plastic material or a rubber material and the like, due to the limitation of strength of the material itself, when the electrical support base 140 and the support base beam are connected by bolts, the electrical support base 140 may be easily damaged, and such connection may thus fail. Therefore, in the embodiments of the disclosure, the electrical support base 140 may further include the first reinforcing member 143 and the first connecting member. The first reinforcing member 143 is disposed in the first connecting hole, and the third connecting hole 1431 is disposed on the first reinforcing member 143. The first connecting member penetrates the third connecting hole 1431 to connect the base body 141 and the beam 120.

The first connecting hole on the base body 141 may be a round hole. Here, the first reinforcing member 143 may exhibit a cylindrical structure, the circular third connecting hole 1431 is disposed on the first reinforcing member 143, and the third connecting hole 1431 may be a through hole or a threaded hole. The first connecting member may be a bolt, and the bolt is connected to the beam 120 through the third connecting hole 1431. Correspondingly, the projection region of the third connecting hole 1431 on the beam 120 may be provided with the fifth connecting hole. The fifth connecting hole may be a threaded hole or a smooth hole. When the fifth connecting hole is a threaded hole, a bolt is matched with the fifth threaded hole, so as to achieve the connection between the electrical support base 140 and the beam 120. When the fifth connecting hole is a smooth hole, a nut may be disposed on the beam 120, and the beam 120 and the electrical support base 140 may be connected through matching of the bolt and the nut. The first connecting hole, the third connecting hole 1431, and the fifth connecting hole may be coaxially arranged.

Certainly, in practical applications, the first connecting hole may also be a square hole, an elliptical hole, or a triangular hole and the like, and the embodiments of the disclosure are not limited thereto. Correspondingly, a shape of the first reinforcing member 143 is matched with that of the first connecting hole.

In the embodiments of the disclosure, strength (compressive strength) of the first reinforcing member 143 is greater than strength (compressive strength) of the electrical support base 140. Moreover, an outer diameter of the first reinforcing member 143 is greater than a diameter of a nut of a connecting bolt. That is, a projection of the nut of the connecting bolt on the first reinforcing member 143 is completely located on a top surface of the first reinforcing member 143, and the first reinforcing member 143 bears a preload force of the bolt after torsion is fixed. In this way, the base body 141 is prevented from being damaged by the preload force when the nut directly contacts the base body 141.

The first reinforcing member 143 is disposed in the first connecting hole on the base body 141, and the first reinforcing member 143 and the base body 141 may be connected through connecting glue. Alternatively, the base body 141 may be formed by injection molding, and the first reinforcing member 143 may be placed in an injection mold during injection molding, and that connection between the first reinforcing member 143 and the base body 141 is achieved.

The connector 160 is connected to the base body 141 through the second connecting hole. For instance, the connector 160 and the base body 141 are connected by means of bolt connection, glue connection, or riveting and the like. The connector 160 may generate heat when functioning. When the base body 141 is made of a plastic material or a rubber material and the like, the heat generated by the connector 160 may cause the base body 141 to be deformed. In order to prevent the base body 141 from being deformed when being heated, in the embodiments of the disclosure, the electrical support base 140 may further include the second reinforcing member 144. The second reinforcing member 144 is disposed in the second connecting hole, a fourth connecting hole 1441 is disposed on the second reinforcing member 144, and the connector is connected to the base body 141 through the fourth connecting hole 1441.

Certainly, in practical applications, the connector 160 may also be directly mounted on the base body 141. That is, the second reinforcing member 144 is not provided between the connector 160 and the base body 141, and the embodiments of the disclosure are not limited thereto. Here, the connector 160 and the base body 141 may be connected to the base body 141 by means of glue connection, engaging connection, or buckling connection.

The second connecting hole on the electrical support base 140 may be a round hole. Here, the second reinforcing member 144 may exhibit a cylindrical structure, the circular fourth connecting hole 1441 is disposed on the second reinforcing member 144, and the fourth connecting hole 1441 may be a threaded hole. The second connecting member may be a bolt, and the bolt is connected to the beam 120 through the fourth connecting hole 1441. The second connecting hole and the fourth connecting hole 1441 may be coaxially arranged.

Certainly, in practical applications, the second connecting hole may also be a square hole, an elliptical hole, or a triangular hole and the like, and the embodiments of the disclosure are not limited thereto. Correspondingly, a shape of the second reinforcing member 144 is matched with that of the second connecting hole.

In the embodiments of the disclosure, strength (compressive strength) of the second reinforcing member 144 is greater than the strength (compressive strength) of the electrical support base 140. Moreover, an outer diameter of the second reinforcing member 144 is greater than the diameter of the nut of the connecting bolt. That is, a projection of the nut of the connecting bolt on the second reinforcing member 144 is completely located on a top surface of the second reinforcing member 144, and the second reinforcing member 144 bears the preload force of the bolt after torsion is fixed. In this way, the base body 141 is prevented from being damaged by the preload force when the nut directly contacts the base body 141.

The second reinforcing member 144 is disposed in the second connecting hole on the base body 141, and the second reinforcing member 144 and the base body 141 may be connected through connecting glue. Alternatively, the base body 141 may be formed by injection molding, and the second reinforcing member 144 may be placed in an injection mold during injection molding, and that connection between the second reinforcing member 144 and the base body 141 is achieved.

When the second reinforcing member 144 is made of an electrically conductive material, the second connecting hole may be a blind hole or a stepped hole, so that the second reinforcing member 144 and the beam 120 do not contact. In this way, the second reinforcing member 144 is prevented from being electrically connected to the beam 120 and the connector, and such electrical connection may cause the battery box body 110 to be charged.

Here, the second reinforcing member 144 being higher than the base body 141 means that the second reinforcing member 144 protrudes from a surface of the base body 141 away from the beam 120. The base body 141 has a first surface and a second surface opposite to each other. The second reinforcing member 144 protrudes from the first surface of the base body 141, and a surface of the second reinforcing member 144 away from the second surface of the base body 141 is higher than the first surface by 0.2 millimeters to 0.4 millimeters.

The second reinforcing member 144 protrudes from the top surface of the base body 141. The connector contacts the top surface of the second reinforcing member 144, such that a gap is formed between the connector and the base body 141. That is, the connector and the base body 141 are not in contact, and the connector is prevented from contacting a plastic surface of the base body 141. As such, a change in temperature increase during a charging and discharging cycle leads to deformation and aging of the plastic material, and attenuation of torque may accordingly occur, which in turn leads to an increase in contact resistance between connectors. If the torque continues to attenuate, the electrical connection between the connectors may be disconnected. Reliability of the connection of the connectors is ensured.

The protective cover 142 is provided with an accommodating space. The protective cover 142 is connected to the base body 141, and the connector is disposed in the accommodating space on the protective cover 142. A first engaging portion 1413 is disposed on the base body 141, and a second engaging portion 1421 is disposed on the protective cover 142. The first engaging portion 1413 and the second engaging portion 1421 are matched to connect the base body 141 and the protective cover 142.

The first engaging portion 1413 is an engaging protrusion, and the engaging protrusion is disposed on a side surface of the base body 141. The second engaging portion 1421 is an engaging groove, and the engaging groove is disposed on a portion of the protective cover 142 opposite to the side surface of the base body 141.

Alternatively, the first engaging portion 1413 is the engaging groove, and the engaging groove is disposed on the side surface of the base body 141. The second engaging portion 1421 is the engaging protrusion, and the engaging protrusion is disposed on the portion of the protective cover 142 opposite to the side surface of the base body 141.

For instance, the base body 141 may include a first connecting portion, a second connecting portion, and a third connecting portion connected in sequence, and first connecting holes are disposed on both the first connecting portion and the third connecting portion. The first connecting hole on the first connecting portion is provided with the first reinforcing member 143. The first connecting hole on the third connecting portion is provided with the first reinforcing member 143. A second connecting hole is disposed on the second connecting portion, and the second reinforcing member 144 is disposed in the second connecting hole. The first connecting portion, the second connecting portion, and the third connecting portion may be integrally formed.

Bottom surfaces of the first connecting portion, the second connecting portion, and the third connecting portion are flush, and the bottom surfaces contact a top portion of the beam 120. A top surface of the second connecting portion is higher than top surfaces of the first connecting portion and the third connecting portion. The top surfaces of the first connecting portion and the third connecting portion are flush. Each of the first connecting portion, the second connecting portion, and the third connecting portion may exhibit a cuboid structure.

The first engaging portion 1413 may be disposed on the second connecting portion, for example, the first engaging portion 1413 is disposed on a side surface of the second connecting portion. The second connecting portion may be provided with four first engaging portions 1413. Correspondingly, four second engaging portions 1421 may also be disposed on the protective cover 142, and engagement of the corresponding engaging portions may allow the connection between the protective cover 142 and the base body 141 to be achieved.

A pass-through notch 1422 may be disposed on the protective cover 142, and the signal acquisition line enters the accommodating space in the protective cover 142 from the pass-through notch 1422. The pass-through notch 1422 on the protective cover 142 may be provided on a first side surface of the protective cover 142, and the first side surface of the protective cover 142 refers to the side of the protective cover 142 facing the battery apparatus 130. When the electrical support base 140 is connected to plural battery assemblies 130, a plurality of the pass-through notches 1422 may be provided on the protective cover 142.

Note that in the embodiments of the disclosure, a plurality of the electrical support bases 140 may be provided on the beam 120, where the multiple electrical support bases 140 may include the high-voltage support base and the low-voltage support base. The electrical support base 140 as the high-voltage support base and the electrical support base as the low-voltage support base 140 are separated by a predetermined distance, and in this way, isolation between the high-voltage support base and the low-voltage support base is kept.

The battery pack provided by the embodiments of the disclosure includes the box body 110, the beam 120, the battery apparatus 130, and the electrical support base 140. The box body 110 and the beam 120 form the battery compartments for accommodating batteries. The electrical support base 140 electrically connected to the battery apparatus 130 is disposed on the beam 120, and in this way, the spaces in the battery compartments may be saved, more batteries may be disposed in the battery compartments, and the spaces in the battery compartments may be effectively used.

Further, as one electrical support base 140 is shared by plural battery assemblies 130, fewer electrical support bases 140 are required in the battery pack. In this way, the space in the battery pack is saved, and costs of the battery pack are lowered. The number of the electrical connection interfaces in the battery pack is reduced, and stability of electrical connection is improved.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising:
a box body;
a beam, disposed in the box body, wherein the beam divides the box body into battery compartments;
battery assemblies, wherein each of the battery assemblies comprises two or more batteries, the battery assemblies are respectively disposed in the battery compartments, and an electrical conductor is disposed on each of the battery assemblies; and
an electrical support base, disposed on the beam, wherein the electrical conductor extends from the battery assemblies to the electrical support base and is connected to the electrical support base, and the electrical conductors on the battery assemblies are directly connected to the same electrical support base,
wherein the electrical support base comprises:
a base body, connected to the beam, wherein the electrical conductor is connected to the base body; and
a protective cover, connected to the base body, wherein a cover body at least covers a junction between the base body and the electrical conductor,
wherein the base body is provided with a first connecting portion, and the electrical support base further comprises:
a first reinforcing member, disposed on the first connecting portion; and
a first connecting member, penetrating the first reinforcing member to connect the base body and the beam,
wherein the base body is further provided with a second connecting portion, the electrical conductor is an electrically conductive bar, and electrically conductive bars of a plurality of battery assemblies are connected to the same second connecting portion,
wherein the electrical support base further comprises:
a second reinforcing member, disposed on the second connecting portion, wherein the second reinforcing member is configured to be connected to the electrical conductor, and the second reinforcing member protrudes from a surface of the base body away from the beam, wherein the base body has a first surface and a second surface opposite to each other, the second reinforcing member protrudes from the first surface of the base body, and a surface of the second reinforcing member away from the second surface of the base body is higher than the first surface by 0.2 millimeters to 0.4 millimeters.

2. The battery pack according to claim 1, wherein a plurality of battery assemblies is disposed in the box body, and electrical conductors on the battery assemblies are connected to the same electrical support base.

3. The battery pack according to claim 2, wherein the electrical conductors continuously extend from the battery assemblies to the electrical support base.

4. The battery pack according to claim 1, wherein the electrical conductor is a signal acquisition line of the battery assemblies, and the electrical support base further comprises:

a connector, disposed on the base body, the protective cover is configured to protect the connector, and the signal acquisition line is connected to the connector.

5. The battery pack according to claim 1, wherein the electrical support base is disposed on a side of the beam away from the box body.

6. The battery pack according to claim 1, wherein the box body further comprises:

a bottom plate; and
a border frame, connected to the bottom plate, wherein the beam and the border frame form a plurality of accommodating portions, and the battery assemblies are disposed in the accommodating portions.

7. The battery pack according to claim 2, wherein the box body further comprises:

a bottom plate; and
a border frame, connected to the bottom plate, wherein the beam and the border frame form a plurality of accommodating portions, and the battery assemblies are disposed in the accommodating portions.

8. The battery pack according to claim 3, wherein the box body further comprises:

a bottom plate; and
a border frame, connected to the bottom plate, wherein the beam and the border frame form a plurality of accommodating portions, and the battery assemblies are disposed in the accommodating portions.

9. The battery pack according to claim 4, wherein the box body further comprises:

a bottom plate; and
a border frame, connected to the bottom plate, wherein the beam and the border frame form a plurality of accommodating portions, and the battery assemblies are disposed in the accommodating portions.

* * * * *